US012248193B2

(12) United States Patent
Walker et al.

(10) Patent No.: US 12,248,193 B2
(45) Date of Patent: Mar. 11, 2025

(54) MECHANICAL PERFORMANCE OF OPTICAL STRANDED CABLES

(71) Applicant: CommScope Technologies LLC, Hickory, NC (US)

(72) Inventors: David J. Walker, Runcorn (GB); Kevin V. Bate, Warrington (GB)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/992,904

(22) Filed: Nov. 22, 2022

(65) Prior Publication Data

US 2023/0086082 A1 Mar. 23, 2023

Related U.S. Application Data

(63) Continuation of application No. PCT/US2021/034363, filed on May 26, 2021.

(60) Provisional application No. 63/033,182, filed on Jun. 1, 2020.

(51) Int. Cl.
  *G02B 6/44* (2006.01)
(52) U.S. Cl.
  CPC .......... *G02B 6/443* (2013.01); *G02B 6/4413* (2013.01); *G02B 6/4429* (2013.01); *G02B 6/4434* (2013.01); *G02B 6/44384* (2023.05)
(58) Field of Classification Search
  CPC .............................. G02B 6/4413; G02B 6/4429
  See application file for complete search history.

(56) References Cited

U.S. PATENT DOCUMENTS

| 4,550,976 A | 11/1985 | Cooper et al. |
| 4,984,869 A * | 1/1991 | Roche ................. G02B 6/4479 57/14 |
| 5,542,020 A * | 7/1996 | Horska ................. G02B 6/449 385/100 |
| 5,852,698 A * | 12/1998 | Bringuier ............. G02B 6/4436 385/113 |
| 5,911,023 A | 6/1999 | Risch et al. |
| 6,066,397 A | 5/2000 | Risch et al. |
| 6,101,305 A * | 8/2000 | Wagman ............. G02B 6/4433 385/136 |
| 6,137,936 A * | 10/2000 | Fitz ..................... G02B 6/4422 385/100 |
| 6,210,802 B1 | 4/2001 | Risch et al. |

(Continued)

FOREIGN PATENT DOCUMENTS

| CN | 209433074 U * | 9/2019 |
| EP | 0 554 789 A1 | 8/1993 |

(Continued)

OTHER PUBLICATIONS

CN-209433074-U English translation (Year: 2019).*

*Primary Examiner* — Charlie Y Peng
(74) *Attorney, Agent, or Firm* — Muncy, Geissler, Olds & Lowe, P.C.

(57) ABSTRACT

A cable includes a cable core including a central strength member. A plurality of buffer tubes, with each buffer tube including a plurality of optical fibers therein, and a plurality of filler rods are stranded about the central strength member. A characterizing feature is that a diameter of each of the plurality of filler rods is larger than a diameter of each of the plurality of buffer tubes. A jacket surrounds the cable core.

19 Claims, 4 Drawing Sheets

(56) References Cited

U.S. PATENT DOCUMENTS

| | | | |
|---|---|---|---|
| 7,203,405 B1 | 4/2007 | Storaasli | |
| 7,346,244 B2 | 3/2008 | Gowan et al. | |
| 9,116,322 B1 * | 8/2015 | Laws | G02B 6/4433 |
| 2004/0071416 A1 | 4/2004 | Militaru | |
| 2005/0244115 A1 | 11/2005 | Bocanegra et al. | |
| 2010/0209057 A1 * | 8/2010 | Drouard | G02B 6/4477 |
| | | | 385/100 |
| 2011/0311191 A1 * | 12/2011 | Hayashishita | G02B 6/446 |
| | | | 385/101 |
| 2012/0134634 A1 * | 5/2012 | Keller | G02B 6/4429 |
| | | | 385/113 |
| 2014/0086543 A1 * | 3/2014 | Blazer | G02B 6/4416 |
| | | | 385/112 |
| 2015/0241652 A1 | 8/2015 | Blazer et al. | |
| 2016/0313529 A1 | 10/2016 | Baucom et al. | |

FOREIGN PATENT DOCUMENTS

| | | | |
|---|---|---|---|
| EP | 0 947 868 A2 | 10/1999 | |
| GB | 1 489 358 A | 10/1977 | |
| GB | 2 184 863 A | 7/1987 | |
| GB | 2193583 A * | 2/1988 | G02B 6/4422 |

* cited by examiner

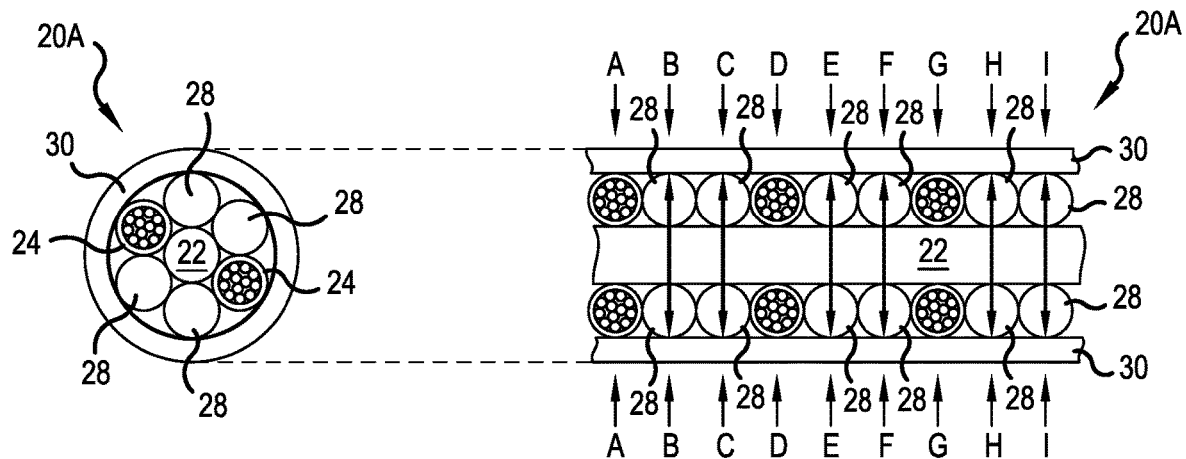
FIG.5
PRIOR ART
FIG.6
PRIOR ART
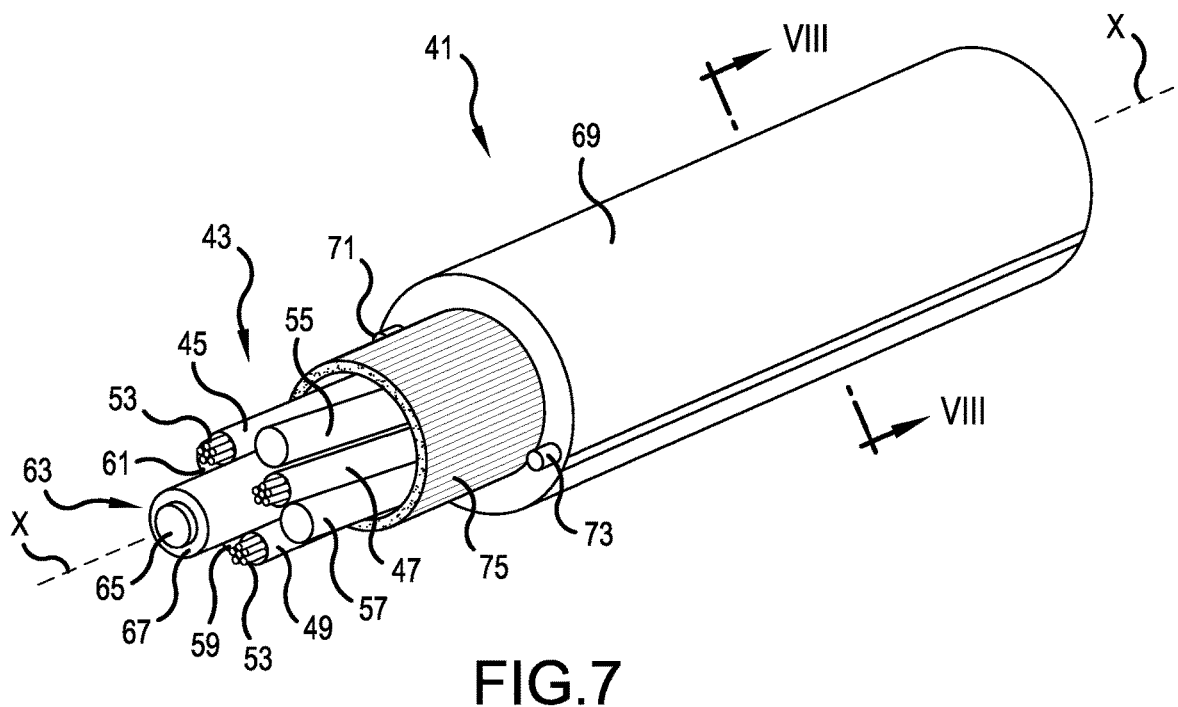
FIG.7

MECHANICAL PERFORMANCE OF OPTICAL STRANDED CABLES

This application is a continuation of International Application No. PCT/US2021/034363, filed May 26, 2021, which claims the benefit of U.S. Provisional Application No. 63/033,182, filed Jun. 1, 2020, both of which are herein incorporated by reference.

BACKGROUND OF THE INVENTION

1. Field of the Invention

The present invention relates to a communications cable. More particularly, the present invention relates to a fiber optic communication cable with oversized filler rods to add crush resistance.

2. Description of the Related Art

Fiber optic cables with a plurality of buffer tubes, such as six buffer tubes, stranded about a central strength member are well known in the existing art. See for example U.S. Published Application Nos. 2004/0071416 and 2015/0241652 and U.S. Pat. No. 7,203,405, each of which is incorporated herein by reference. Each buffer tube includes a plurality of optical fibers, such as eight or twelve optical fibers per buffer tube. When the fiber optic cable does not need so many optical fibers, it is common to replace one or more of the buffer tubes with a filler rod.

FIG. 1 shows a cross sectional view of a prior art fiber optic cable 8, wherein two side-by-side filler rods 18, along with four buffer tubes 12, are stranded around a central strength member 10 to form a cable core. The cable core is surrounded by a jacket 16.

As shown in FIG. 2, due to the stranding pattern around the central strength member 10, each of the filler rods 18 is diametrically opposite a respective buffer tube 12 along the length of the fiber optic cable 8. Hence, any one of diametrically opposed pinching forces A, B, C, D, E, F, G, H and I applied to the jacket 16 could lead to the crushing of a buffer tube 12. FIGS. 1 and 2 herein are shown as FIGS. 2(a) and 2(b) in U.S. Pat. No. 7,203,405, as previously incorporated by reference.

Crush occurs when the jacket 16 of the fiber optic cable 8 is subjected laterally to external pressures, such as when the cable is being pulled into a conduit and the jacket 16 is pulled against a conduit fitting, or an edge an enclosure opening, or even against a rigid adjacent cable, like a power cable. The fiber optic cable 8 is compressed and deformed. The deformation can crush the buffer tubes 12 and hence the optical fibers within the buffer tubes 12. Compression of the optical fibers can lead to micro-bends and/or breakage of the optical fibers, causing transmission errors and/or transmission failure.

A solution proposed by U.S. Pat. No. 7,203,405 is to place filler rods 28 diametrically opposed within the cable core, as shown in FIG. 3. FIG. 3 shows a cross sectional view of a prior art fiber optic cable 20, wherein two diametrically opposed filler rods 28, along with four buffer tubes 24, are stranded around a central strength member 22 to form a cable core. The cable core is surrounded by a jacket 30.

As shown in FIG. 4, due to the stranding pattern around the central strength member 22, the filler rods 28 are diametrically opposite to each other. Hence, as illustrated in FIG. 4, with the diametrically opposed pinching forces A, B, C, D, E, F, G, H and I applied to the jacket 30, the forces applied at C, F and I are supported by the filler rods 28. In other words, the pinching forces applied to the jacket 30 at locations C, F and I are well supported by the abutments between the central strength member 22 and the filler rods 28 on either side of the central strength member 22. Crush may occur to some degree when pinch forces are applied at locations A, B, D, E, G and H, and is most likely to occur are pinch points between A and B, between D and E, and between G and H. FIGS. 3 and 4 herein are shown as FIGS. 3(a) and 3(b) in U.S. Pat. No. 7,203,405, and may be more fully understood with reference thereto.

FIG. 5 shows a cross sectional view of a prior art fiber optic cable 20A, wherein four diametrically opposed filler rods 28, along with two buffer tubes 24, are stranded around the central strength member 22 to form a cable core. The cable core is surrounded by the jacket 30.

As shown in FIG. 6, due to the stranding pattern around the central strength member 22, the filler rods 28 are diametrically opposite to each other. Hence, as illustrated in FIG. 6, with the diametrically opposed pinching forces A, B, C, D, E, F, G, H and I applied to the jacket 30, the forces applied at B, C, E, F, H and I are supported by the filler rods 28. In other words, the pinching forces applied to the jacket 30 at locations B, C, E, F, H and I are well supported by the abutments between the central strength member 22 and the filler rods 28 on either side of the central strength member 22. Crush may occur to some degree when pinch forces are applied at locations A, D and G. FIG. 5 herein is shown as FIG. 4 in U.S. Pat. No. 7,203,405, and may be more fully understood with reference thereto.

SUMMARY OF THE INVENTION

The Applicant has appreciated an improved cable core design to strengthen the cable core. The new design allows the jacket of the cable to experience a large lateral force, e.g., a pinching force, without crushing the buffer tubes within the cable core. A new internal geometry and relative sizing of the components of the cable core allow lateral forces applied to the cable jacket to be either wholly or partially redirected away from the buffer tubes. In either instance, the likelihood of crushing a buffer tube within the cable core is reduced. In other words, the buffer tubes are more protected than in the crush avoidance systems of the prior art.

One or more of the drawbacks of the prior art and the objectives of the present invention are addressed by a cable with a cable core including a central strength member. A plurality of buffer tubes, with each buffer tube including a plurality of optical fibers therein, and a plurality of filler rods are stranded about the central strength member. The filler rods are diametrically opposite to each other within the cable core. A characterizing feature is that a diameter of each of the plurality of filler rods is larger than a diameter of each of the plurality of buffer tubes. A jacket surrounds the cable core.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 5 is a cross sectional view of a third fiber optic cable in accordance with the prior art;

FIG. 6 is an illustration of the alignments of the elements within the fiber optic cable of FIG. 5 at different length locations along a jacket of the fiber optic cable;

FIG. 7 is a front perspective view of a fiber optic cable in accordance with the present invention;

DETAILED DESCRIPTION OF EMBODIMENTS OF THE INVENTION

Figure 1:
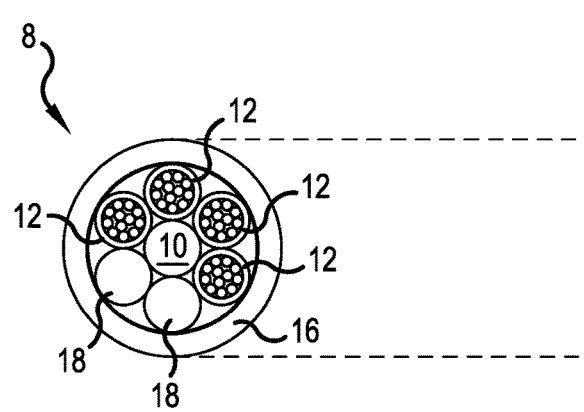
FIG. 1 is a cross sectional view of a first fiber optic cable in accordance with the prior art.
Figure 2:
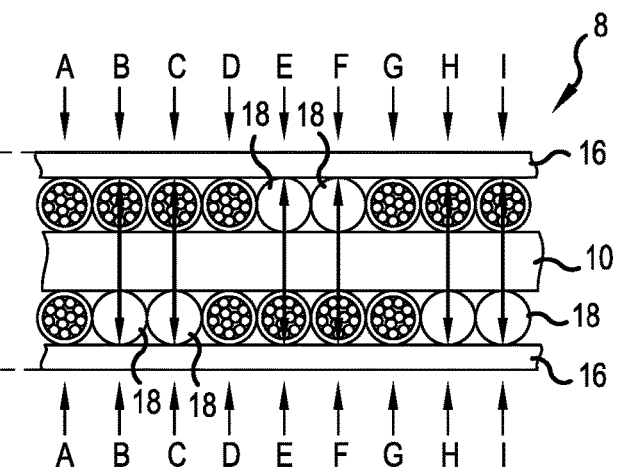
FIG. 2 is an illustration of the alignments of the elements within the fiber optic cable of FIG. 1 at different length locations along a jacket of the fiber optic cable.
Figure 3:
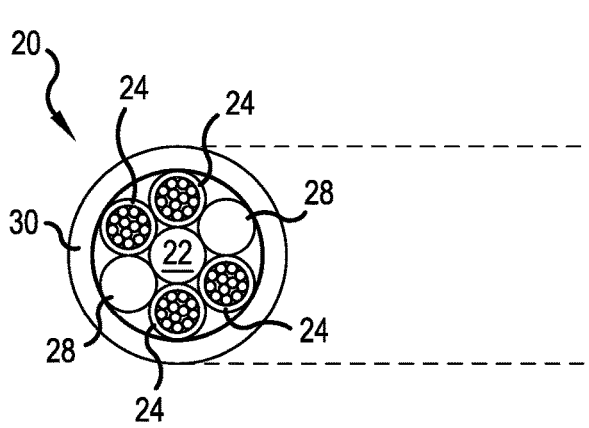
FIG. 3 is a cross sectional view of a second fiber optic cable in accordance with the prior art.
Figure 4:
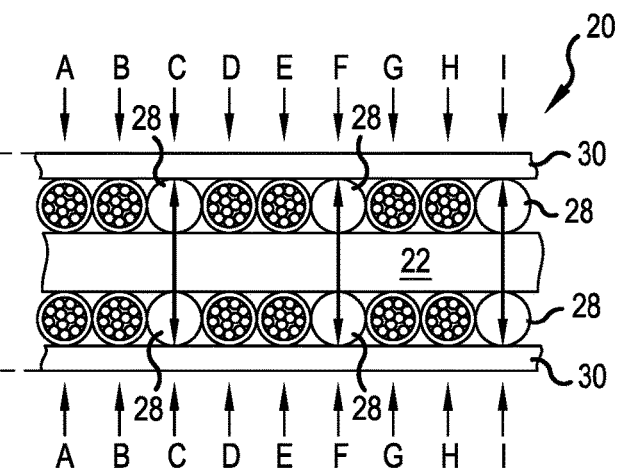
FIG. 4 is an illustration of the alignments of the elements within the fiber optic cable of FIG. 3 at different length locations along a jacket of the fiber optic cable.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 8:
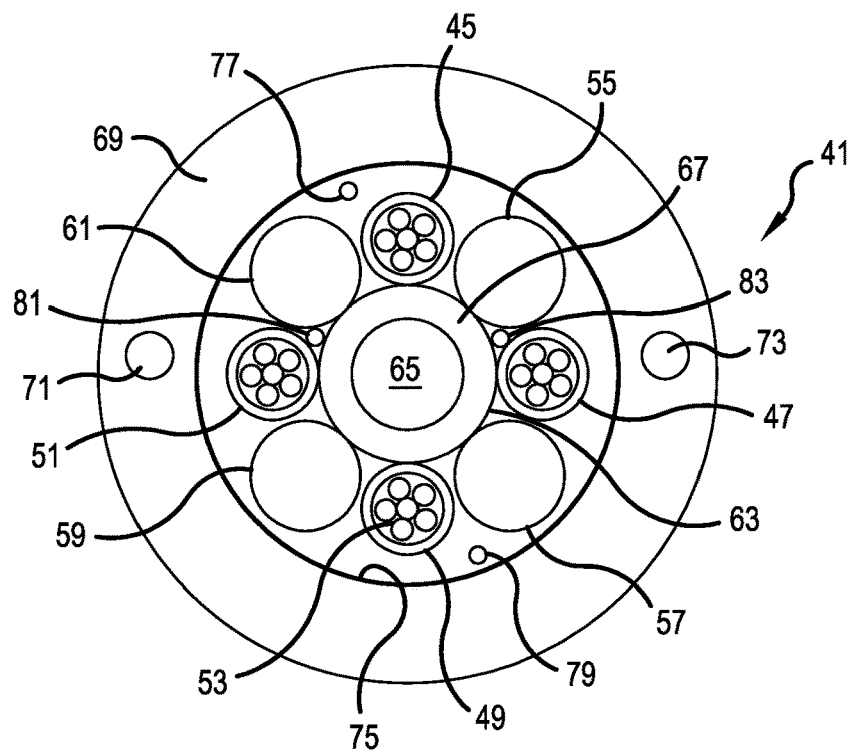
FIG. 8 is a cross sectional view taken along line VIII-VIII in FIG. 7.

FIG. 7 is a front perspective view of a fiber optic cable 41 in accordance with the present invention. FIG. 8 is a cross sectional view taken along line VIII-VIII in FIG. 7. The fiber optic cable 41 includes an inner core 43. The inner core 43 includes a plurality of buffer tubes, such as first, second, third and fourth buffer tubes 45, 47, 49 and 51. Each of the first, second, third and fourth buffer tubes 45, 47, 49 and 51 has a diameter between 0.9 mm and 1.5 mm, such as between 1.1 mm and 1.3 mm, for example about 1.2 mm.

Each of the first, second, third and fourth buffer tubes 45, 47, 49 and 51 includes a plurality of optical fibers 53 therein. In the depicted embodiments, each of the first, second, third and fourth buffer tubes 45, 47, 49 and 51 includes six optical fibers 53. However, more or fewer optical fibers 53 may be included, and different numbers of optical fibers 53 may be included in each of the first, second, third and fourth buffer tubes 45, 47, 49 and 51.

A central strength member 63 is provided along a central axis X of the fiber optic cable 41. A diameter of the central strength member 63 is between 1.9 mm and 2.9 mm, such as between 2.2 mm and 2.6 mm, for example about 2.4 mm. In the embodiment of FIGS. 7 and 8, the central strength member 63 is formed of a core 65 surrounded by a sheath 67, to form an up jacketed central strength member 63. When up-jacketed, the sheath 67 has an outer diameter of about 2.4 mm, while the core 65 may have a diameter of about 1.6 mm. The core 65 may be formed as a glass reinforced plastic (GRP) rod, while the sheath 67 may be formed of a polymer material, such as a low-smoke, zero-halogen polymer. If the sheath 67 is not used, the entire central strength member 63 may be formed as a GRP rod.

A plurality of filler rods, such as first, second, third and fourth filler rods 55, 57, 59 and 61 are stranded with the plurality of buffer tubes 45, 47, 49 and 51 around the central strength member 63. The stranding may be in one direction, such as clockwise twisting of the buffer tubes 45, 47, 49 and 51 and the filler rods 55, 57, 59 and 61 about the central strength member 63 in FIG. 8. However, in another embodiment, the stranding is in a S-Z pattern with switchbacks, where the clockwise twisting about the central strength member 63 changes to counterclockwise and vice versa at the switchbacks along the length of the fiber optic cable 41. Each of the first, second, third and fourth filler rods 55, 57, 59 and 61 has a diameter between 1.1 mm and 1.7 mm, such as between 1.3 mm and 1.6 mm, for example about 1.4 mm or about 1.5 mm. The first, second, third and fourth filler rods 55, 57, 59 and 61 are preferably formed of a low smoke zero halogen (LSZH) material.

Finally, a jacket 69 surrounds the cable core 41. An outer diameter of the jacket 69 is between 7.0 mm and 9.4 mm, such as between 7.6 mm and 8.8 mm, for example 8.6 mm. The jacket 69 may be formed of any polymer material, however an ultra low smoke zero halogen (ULSZH) material is preferred. The jacket 69 may include one or more stripes of a contrasting color, to help identify the fiber optic cable 41. For example, the majority of the jacket 69 may be black and the one or more stripes of a red, yellow and/or green color may be embedded within or printed onto the jacket 69.

A characterizing feature is that a diameter of each filler rod of the plurality of filler rods 55, 57, 59 and 61 is more than 10% larger in diameter as compared to each buffer tube of the plurality of buffer tubes 45, 47, 49 and 51. For example, filler rods with a diameter of 1.4 mm are about 17% larger in diameter as compared to buffer tubes with a 1.2 mm diameter.

As seen in FIGS. 7 and 8, the jacket 69 may optionally include first and second embedded strength members 71 and 73 therein. The first and second embedded strength members 71 and 73 are preferably GRP rods spaced one hundred eighty degrees apart from each other within a wall forming the jacket 69. The first and second embedded strength members 71 and 73 could potentially be formed as metallic rods, so as to enable toning of the fiber optic cable 41, should the fiber optic cable 41 need to be located underground or amongst a plurality of cables.

FIGS. 7 and 8 also show a plurality of textile strength elements 75, such as yarns, within the jacket 69. The yarns surround the cable core 43. The yarns may be formed into bundles of fibers, each of which extends longitudinally along the length of the fiber optic cable 41. Alternatively, the yarns may be formed into a first grouping and a second grouping of yarns. The first grouping of yarns is helically wrapped around the cable core 43 in a first wrapping direction. The second grouping of yarns is helically wrapped around the cable core 43 in a second wrapping direction, opposite to the first wrapping direction. The first and second groupings of yarns cross over each other to hold the elements of the cable core 43 together during manufacturing of the fiber optic cable 41. In a preferred embodiment, the textile strength elements 75, are formed of flaccid threads or yarns, like E-Glass strength members or aramid fibers, sold under the trademark KELVAR.

As seen in FIGS. 7 and 8, the fiber optic cable includes at least one rip cord, such as first and second rip cords 77 and 79 within the jacket 69. The first and second ripcords 77 and 79 assist in opening up an end of the fiber optic cable 41 for a termination to one or more connectors. The first and second rip cords 77 and 79 may also be formed of flaccid threads, like aramid threads, sold under the trademark KELVAR. FIGS. 7 and 8 also show at least one water blocking tape or thread, such as first and second water blocking threads 81 and 83 included within the cable core 43.

Figure 9:
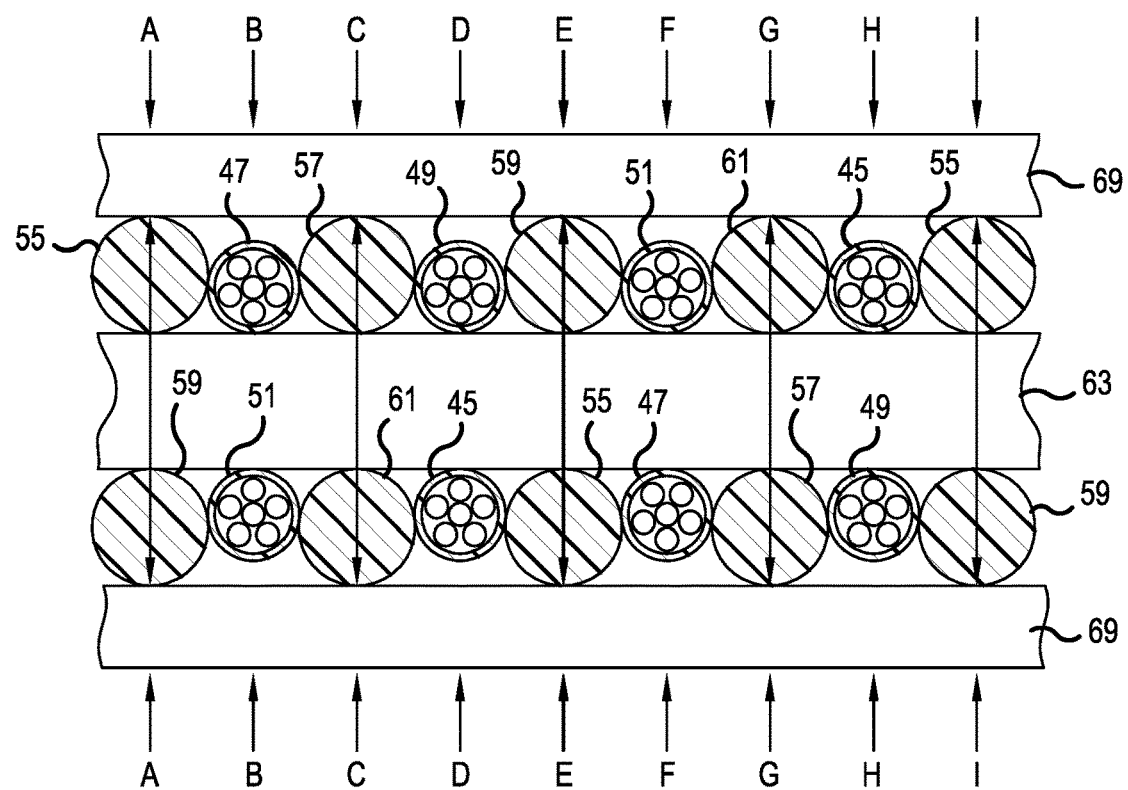
FIG. 9 is an illustration of the alignments of the elements within the fiber optic cable of FIGS. 7 and 8 at different length locations along a jacket of the fiber optic cable.

FIG. 9 shows the stranding pattern around the central strength member 63, the first, second, third and fourth filler rods 55, 57, 59 and 61 are diametrically opposite to each other. Hence, as illustrated in FIG. 9, with the diametrically opposed pinching forces A, C, E, G and I applied to the jacket 69, the forces applied at A, C, E, G and I are supported by the filler rods 55, 57, 59 and 61. In other words, the pinching forces applied to the jacket 69 at locations A, C, E, G and I are well supported by the abutments between the central strength member 63 and the filler rods 55, 57, 59, and 61 on either side of the central strength member 63.

Contrary to the embodiments of the prior art, crush is not likely to occur when pinch or lateral forces are applied at the other locations B, D, F and H. This is because the oversized filler rods 55, 57, 59 and 61 act as supports to keep the force applied to the jacket 69 at locations B, D, F and H from reaching the buffer tubes 45, 47, 49 and 51. In other words, the filler rods 55, 57, 59 and 61 act as table legs and the jacket 69 acts as a table top. For example, when a force is applied to location B, the jacket 69 (table top) causes the force to be split and support by the first and second filler rods 55 and 57. The first and second filler rods 55 and 57 directly abut the central strength member 63. Hence, the jacket 69 would need to deform a significant amount before any of the force at location B would allow the jacket 69 to contact the second buffer tube 47.

Figure 10:
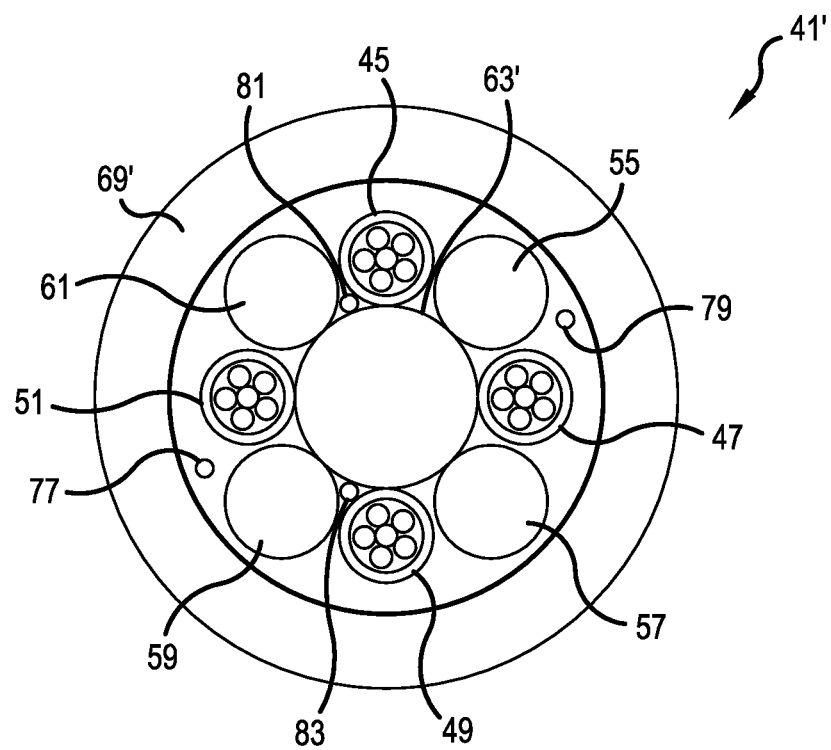
FIG. 10 is a cross sectional view, similar to FIG. 8, but illustrating alternative features for the fiber optic cable of FIGS. 7 and 8.

FIG. 10 is a cross sectional view similar to FIG. 8 of a modified fiber optic cable 41'. The modified fiber optic cable 41' is an alternative to the fiber optic cable 41. The only changes are that the first and second embedded strength members 71 and 73 are not included within the jacket 69', and the wall forming the jacket 69' has been made thinner. The central strength member 63' does not include a sheath 67, and can be made of a smaller diameter, if desired. The filler rods 55, 57, 59 and 61 may also be made of a slightly smaller diameter, if desired. The changes result in the modified fiber optic cable 41' having an overall diameter of about 7.8 mm.

In the above embodiments, the filler rods 55, 57, 59 and 61 may be formed of a dielectric plastic, and directly abut the central strength member 63. The central strength member 63, due to its embedded fiberglass segments, provides a high degree of strength to the fiber optic cable 41, 41'. The filler rods 55, 57, 59 and 61 do not provide much added strength to the fiber optic cable 41, 41', but primarily assist in preventing a crushing of the buffer tubes 45, 47, 49 and 51 within cable core 43. The filler rods 55, 57, 59 and 61 may also assist in keeping the overall outer cross sectional shape of the fiber optic cable 41, 41' circular, so that the fiber optic cable 41, 41' can be stored and transported on a reel and deployed in the field more easily.

Although each buffer tube 45, 47, 49 and 51 has been illustrated as having six optical fibers 53, other numbers of optical fibers 53 are possible, such as four, eight, ten or twelve optical fibers 53, preferably surrounded by a gel, such as a water blocking gel, within the buffer tubes 45, 47, 49 and 51. Instead of a gel, it would also be possible to include a water blocking thread or tape within each buffer tube 45, 47, 49 and 51.

FIGS. 7-10 illustrated six optical fibers loosely contained within each of the four buffer tubes 45, 47, 49 and 51, making a total of 24 optical fibers in the fiber optic cable 41, 41'. However, it would be possible to replace one or more of the buffer tubes 45, 47, 49 and 51 with yet another filler rod, such as a dielectric member of a same diameter as the replaced buffer tube, to reduce the fiber count of the fiber optic cable 41, 41'.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A cable comprising:
   a cable core including:
      a central strength member;
      a plurality of buffer tubes, with each buffer tube including at least one optical fiber therein;
      a plurality of filler rods, wherein said plurality of buffer tubes and said plurality of filler rods are stranded around said central strength member, wherein an outer diameter of each filler rod of said plurality of filler rods is greater than an outer diameter of each buffer tube of said plurality of buffer tubes; and
   a polymer jacket formed of a polymer material surrounding said cable core, wherein an outer diameter of said polymer jacket is between 7.0 mm and 9.4 mm, and wherein a pinch force applied to an outside wall of said polymer jacket is supported by two or more of said plurality of filler rods in direct abutments between an inner wall of said polymer jacket and said central strength member, and wherein said abutments space said inner wall of said polymer jacket out of direct contact with said plurality of buffer tubes.

2. The cable according to claim 1, wherein said plurality of buffer tubes and said plurality of filler rods are stranded around said central strength member in one direction.

3. The cable according to claim 1, wherein said plurality of buffer tubes and said plurality of filler rods are S-Z stranded around said central strength member.

4. The cable according to claim 1, wherein an outer diameter of said central strength member is between 1.9 mm and 2.9 mm.

5. The cable according to claim 1, wherein said jacket includes first and second strength members embedded within said wall forming said jacket.

6. The cable according to claim 5, wherein said first and second embedded strength members are GRP rods spaced about one hundred eighty degrees apart from each other within said wall forming said jacket.

7. The cable according to claim 1, wherein said at least one optical fiber in each buffer tube includes at least six optical fibers in each buffer tube.

8. The cable according to claim 1, further comprising:
   a plurality of textile strength elements within said jacket and surrounding said cable core.

9. The cable according to claim 1, further comprising:
   at least one rip cord within said jacket.

10. The cable according to claim 1, further comprising:
    at least one water blocking tape or thread included within said cable core.

11. The cable according to claim 1, wherein an outer diameter of each buffer tube of said plurality of buffer tubes is between 0.9 mm and 1.5 mm.

12. The cable according to claim 1, wherein an outer diameter of each filler rod of said plurality of filler rods is between 1.1 mm and 1.7 mm.

13. A cable comprising:
    a cable core including:
       a central strength member, formed as a glass reinforced plastic (GRP) rod having a diameter of between 1.9 mm and 2.9 mm;
       a plurality of buffer tubes, with each buffer tube including a plurality of optical fibers therein;
       a plurality of filler rods, each formed of a dielectric plastic, wherein said plurality of buffer tubes and said plurality of filler rods are stranded around said central strength member, wherein an outer diameter of each filler rod of said plurality of filler rods is more than 10% larger than an outer diameter of each buffer tube of said plurality of buffer tubes; and
    a polymer jacket formed of a polymer material surrounding said cable core, and wherein a pinch force applied to an outside wall of said polymer jacket is supported by two or more of said plurality of filler rods in abutments between an inner wall of said polymer jacket and said central strength member, and wherein said abutments space said inner wall of said polymer jacket out of contact with said plurality of buffer tubes.

14. The cable according to claim 13, wherein said plurality of buffer tubes and said plurality of filler rods are stranded around said central strength member in one direction.

15. The cable according to claim 14, wherein an outer diameter of said jacket is between 7.0 mm and 9.4 mm, wherein an outer diameter of each buffer tube of said plurality of buffer tubes is between 0.9 mm and 1.5 mm, and wherein an outer diameter of each filler rod of said plurality of filler rods is between 1.1 mm and 1.7 mm.

16. The cable according to claim 14, wherein said jacket includes first and second strength members embedded within said wall forming said jacket, and wherein said first and second embedded strength members are GRP rods spaced about one hundred eighty degrees apart from each other within said wall forming said jacket.

17. The cable according to claim 14, wherein said plurality of optical fibers in each buffer tube includes at least six optical fibers in each buffer tube.

18. The cable according to claim 17, further comprising:
    a plurality of textile strength elements within said jacket and surrounding said cable core; and
    at least one rip cord within said jacket.

19. The cable according to claim 18, further comprising:
    at least one water blocking tape or thread included within said cable core.

* * * * *